United States Patent [19]
Johnson

[11] Patent Number: 5,464,040
[45] Date of Patent: Nov. 7, 1995

[54] SAFETY VALVE ACTUATOR

[75] Inventor: Clarence W. Johnson, Calgary, Canada

[73] Assignee: Barber Industries Ltd., Calgary, Canada

[21] Appl. No.: 202,577

[22] Filed: Feb. 28, 1994

Related U.S. Application Data

[60] Continuation of Ser. No. 805,493, Dec. 9, 1991, Pat. No. 5,291,918, which is a division of Ser. No. 513,054, Apr. 11, 1990, Pat. No. 5,070,900, which is a continuation of Ser. No. 153,259, Feb. 8, 1988, abandoned, which is a continuation-in-part of Ser. No. 43,336, Apr. 28, 1987, abandoned.

[51] Int. Cl.$^6$ .................................................. F01B 31/12
[52] U.S. Cl. .............................. 137/556; 92/5 R
[58] Field of Search ................. 137/556, 556.3, 137/556.6; 92/5 R

[56] References Cited

U.S. PATENT DOCUMENTS

| | | | |
|---|---|---|---|
| 2,080,760 | 5/1937 | Condon | 137/556 X |
| 2,605,748 | 8/1952 | Rasoletti | 92/5 R |
| 5,156,179 | 10/1992 | Peterson et al. | 137/556 X |

FOREIGN PATENT DOCUMENTS

| | | | |
|---|---|---|---|
| 1029524 | 5/1958 | Germany | 137/556 |

Primary Examiner—Stephen M. Hepperle
Attorney, Agent, or Firm—John R. Uren

[57] ABSTRACT

An emergency shut-down system to close a gate valve in a pipeline and therefore terminate flow. The closing action is initiated when a pilot valve senses pressure in the pipeline outside predetermined limits. This reduces the signal pressure in the system which, in turn, causes a fluid dump from the gate valve actuator which closes the gate valve and terminates fluid flow in the pipeline. The system is reactivated by manually pumping the system which re-opens the gate valve and allows fluid flow in the pipeline to again continue.

4 Claims, 8 Drawing Sheets

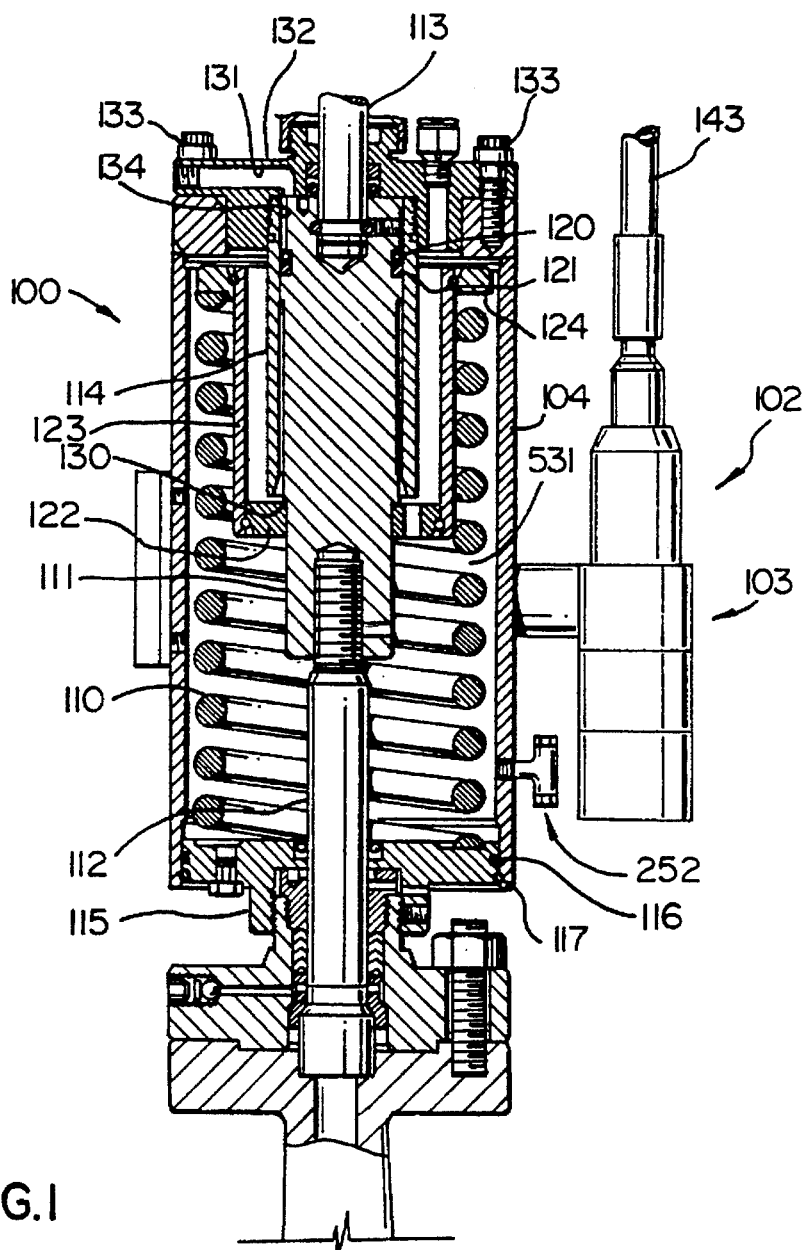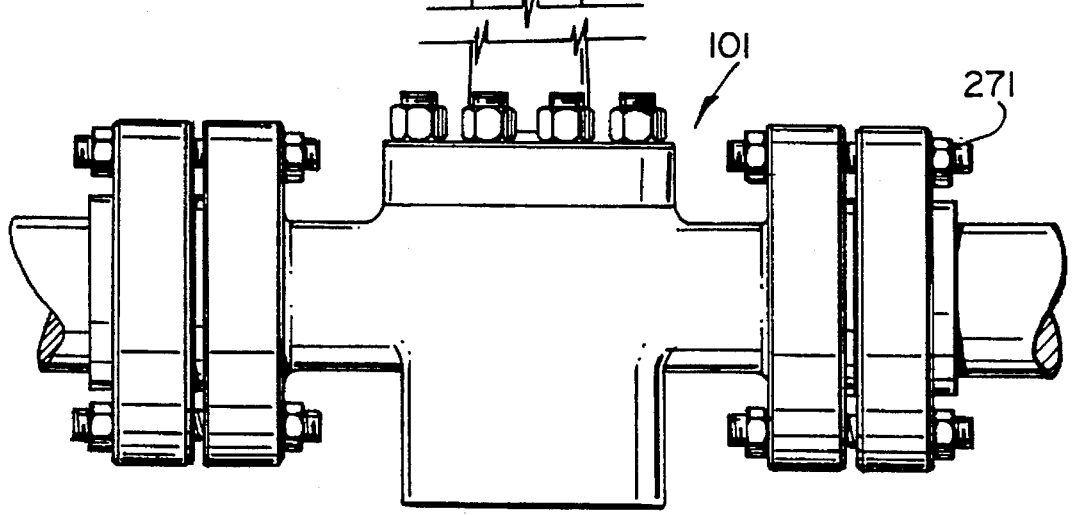
FIG.1

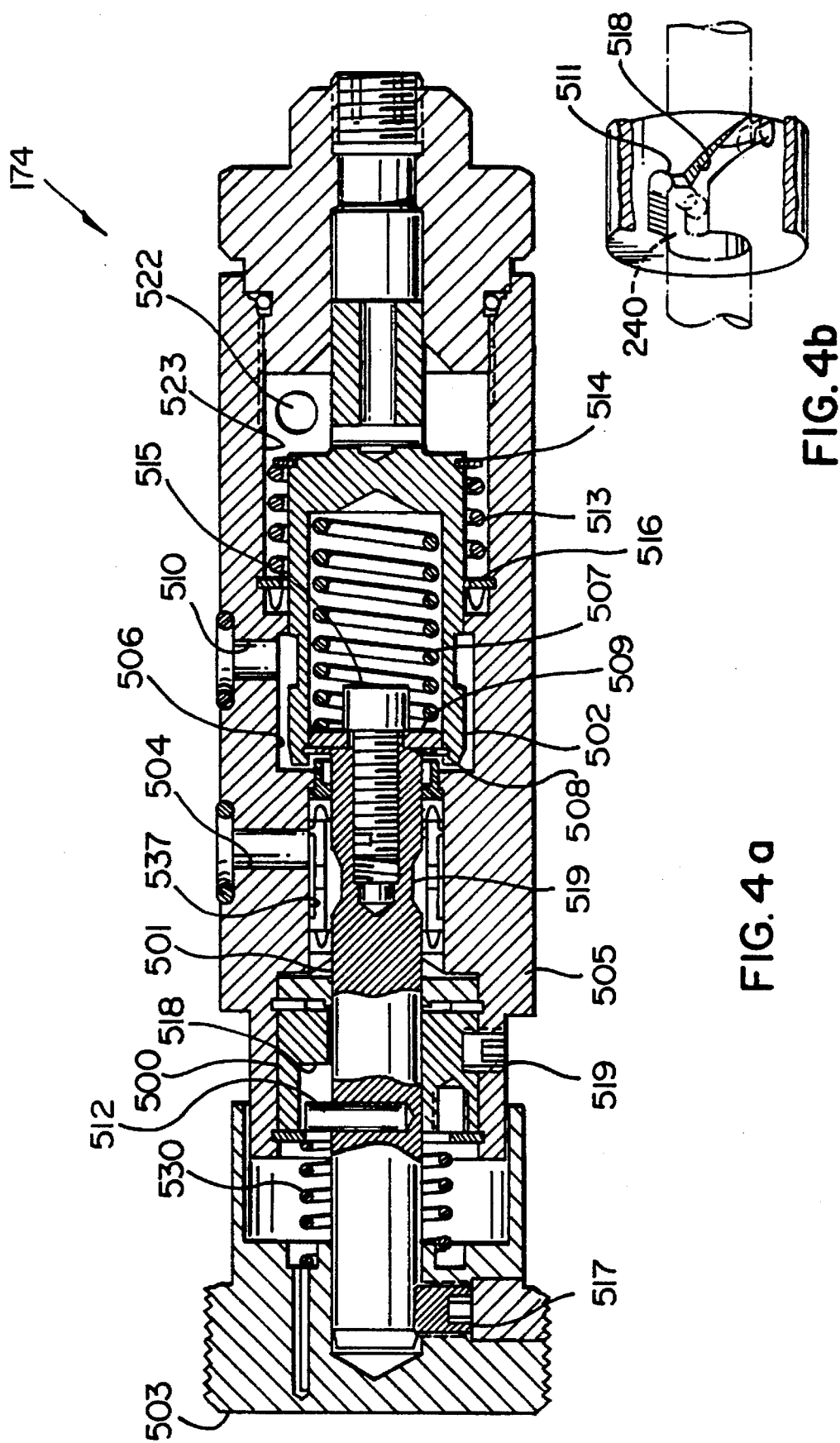

SAFETY VALVE ACTUATOR

This application is a continuation of U.S. patent application Ser. No. 07/805,493, filed Dec. 9, 1991 now U.S. Pat. No. 5,291,918, which in turn is a divisional of U.S. Ser. No. 07/513,054 filed Apr. 11, 1990, now U.S. Pat. No. 5,070,900, which in turn is a Rule 62 file wrapper continuation of U.S. Ser. No. 07/153,259 filed Feb. 8, 1988 now abandoned which in turn is a continuation-in-part of U.S. Ser. No. 07/043,336 filed Apr. 28, 1987, now abandoned.

BACKGROUND OF THE INVENTION

Gate valves are located intermittently along the length of gas and oil pipelines. Such valves are adapted to generally remain open but under dislocations in the fluid flow within the pipeline caused by, for example, a leak in the pipeline, the valves are each adapted to close thus shutting off the flow of oil or gas until the dislocation is located and repaired.

Gate valves and associated actuator systems to perform such functions are known. Such an actuator system and gate valve is disclosed in our U.S. Pat. No. 4,423,758 to Ellett entitled EMERGENCY SHUT DOWN DEVICE. Certain new and inventive improvements have been made, however, in the gate valve actuator system there disclosed.

In the apparatus disclosed in the aforementioned reference, the preload in the compression spring within the housing of the actuator is constant. In order to change this preload in the spring, which may be required, for example, when the actuator is used with a different valve, it was necessary to disassemble the Ellett device to vary the spring loading. The disassembly was difficult and time consuming.

A further disadvantage with the Ellett apparatus related to the position of the piston after the preload in the compression spring was changed. When a spacer was added between the pull tube and the end plate, the piston would move upwardly with the pull tube with the result that the stroke necessary to completely close the valve would be shortened by a like amount and this reduced length stroke might not fully close the valve. To compensate for this stroke reduction, a spacer was added between the piston and the pull tube. Because the stop tube is integral with the pull tube, however, and does not move relative to the pull tube, it was necessary to either provide a new pull tube and stop tube or to reduce the length of the stop tube by cutting or machining. This was also costly and unnecessarily time consuming.

Yet a further disadvantage in the aforementioned Ellett apparatus related to the necessity in actuators to have different stroke lengths for different valves. In the Ellett apparatus, there was no adjustment for the stroke possible and, therefore, there was little universality of the actuator for valves of various sizes.

Yet a further undesirable feature of existing actuators relates to the use of the indicator rod which indicates whether or not the valve is open or closed. It is desirable that the indicator rod attached to the piston be of a configuration which allows the valve to be mechanically maintained in an open position in the absence of pressure in the cylinder.

Yet a further disadvantage with existing actuators relates to removing the actuator from the valve while maintaining the valve in the open position there being a large force exerted on the piston by the compression spring. Disassembly of the actuator and, in particular, removing the hub from the end plate under such conditions can be dangerous.

SUMMARY OF THE INVENTION

According to one aspect of the invention, there is disclosed a pressure monitoring system for a pipeline, said system comprising a signal circuit, an actuator circuit and an accumulator, said signal and actuator circuits being operable by common hydraulic fluid flowing between said circuits and said accumulator being operable to receive and discharge fluid from both of said signal and actuator circuits.

According to a further aspect of the invention, there is disclosed a shut down system for a pipeline comprising valve means in said pipeline, hydraulic fluid to actuate said valve means, circuit means to monitor the pressure in said pipeline, said circuit means including a signal circuit and a high pressure circuit utilizing hydraulic fluid circulated between both said pilot and high pressure circuits, actuator means including reservoir means for said valve means, said reservoir means being operable to hold said hydraulic fluid and spring means in said reservoir means to actuate said valve means.

According to a further aspect of the invention, there is disclosed an actuator for a valve means, said actuator comprising pumping means operable to pump hydraulic fluid from a reservoir to actuate said valve means in a first direction and spring means to actuate said valve means in a second direction, said spring means being contained in said reservoir.

According to yet a further aspect of the invention, there is disclosed a trip valve for a hydraulic circuit monitoring a pressure source, said valve comprising a rotatable control knob having a first, second and third operating position, said first position being an ARMED position indicating said source is operating within predetermined limits, said second position being a TRIPPED position indicating said source is operating outside said predetermined limits and said third position being a LATCHED position indicating said hydraulic circuit is ready to be returned to said ARMED position.

According to yet a further aspect of the invention, there is disclosed a pressure reducing valve for a hydraulic circuit comprising a nozzle, a seat operable to contact said nozzle and a poppet reciprocal on said nozzle and operable to hold said seat.

According to yet a further aspect of the invention, there is disclosed a reservoir for hydraulic fluid comprising a housing, a first closure member at one end of said housing, a removable second closure member at the opposite end of said housing, and retaining means to retain said second closure member within said housing, said housing further including a compression spring-acting between first and second closure members, said retaining means being removable only upon compression of said compression spring.

According to yet a further aspect of the invention, there is provided a valve actuator apparatus comprising a housing, first and second end plates connected to said housing, a hub-cylinder assembly removably connected to said first end plate, compression spring means mounted in said housing between said first and second end plates, spring plate means mounted between said first end plate and said compression spring means and being movable relative to said first end plate, a pull tube movable with said spring plate and load plate means connected to said pull tube, the axial distance between said load plate means and said spring plate means being adjustable.

According to a further aspect of the invention, there is disclosed a valve actuator apparatus comprising a housing, a piston movable within said housing and being operably connected to a valve stem, a load plate means operably connected to said piston, pull tube means operably connected to said load plate means and stop means between said piston and said housing, said stop means being separable from said pull tube.

According to yet a further aspect of the invention, there is disclosed a valve actuator apparatus comprising a piston and an indicator rod connected to said piston, said indicator rod being adjustably mounted for relative axial movement relative to said piston.

According to yet a further aspect of the invention, there is disclosed a valve actuator assembly comprising a housing, a piston movable in said housing, an indicator rod adjustably mounted in said piston and friction control means operable to inhibit the rotation of said indicator rod relative to said piston.

According to yet a further aspect of the invention, there is disclosed a valve actuator apparatus comprising a housing, an indicator rod reciprocal in said housing between a first open position when said rod is in an extended position relative to said housing and a second closed postion when said rod is in a retracted position relative to said housing, said rod having a collar mounted thereon, said collar having outside dimensions larger than the outside dimensions of said indicator rod.

BRIEF DESCRIPTION OF THE SEVERAL VIEWS OF THE DRAWINGS

Specific embodiments of the invention will now be described, by way of example only, with the use of drawings in which:

FIG. 1 is a view of the shut-down system, shown partially in section, with the attached pump, pressure reducing valve and latching trip valve;

FIG. 4a is an enlarged sectional view of the latching trip valve used in the embodiment illustrated in FIGS. 2a and 2b and shown in the ARMED position;

FIG. 4b is a partial isometric view of the cam track or surface of the latching trip valve of FIG. 4a illustrating the LATCHED, ARMED and TRIPPED positions;

DESCRIPTION OF SPECIFIC EMBODIMENT

Figure 2A:
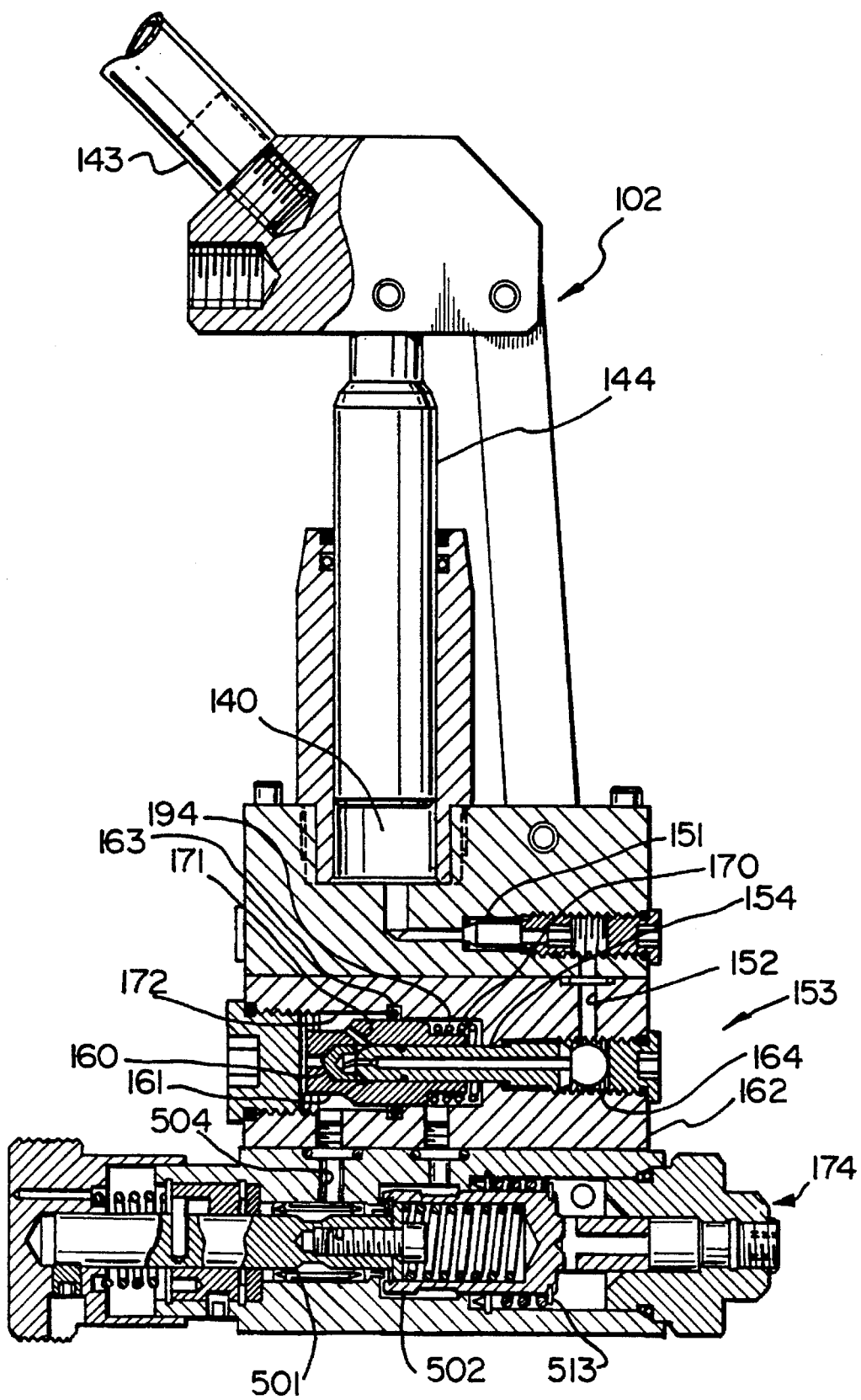
FIG. 2a is a sectional view of the pump, pressure reducing valve and latching trip mechanisms illustrated in the ARMED position.

Referring now to the drawings, an emergency shut down or gate valve actuator system is generally illustrated at 100 in FIG. 1. It comprises a gate valve generally shown at 101 used to open and close a pipeline 271, a pump assembly generally shown at 102 and a valve sub-assembly generally shown at 103 connected to the pump assembly 102.

The gate valve actuator system 100 includes a housing 104, a compression spring 110 within the housing 104, a piston 111, an attached valve stem 112, and an indicator rod 113 connected to piston 111, the indicator rod 113 only being partially illustrated in FIG. 1. A cylinder 114 surrounds piston 111 and a seal 120 and a backup ring 121 act between the piston 111 and cylinder 114 to define a chamber 134 in communication with fluid passage 131.

An end plate 115 retains spring 110 in the housing 104 and a seal 116 seals the end plate 115. A retaining ring 117 retains the end plate 115 and cannot be removed unless spring 110 is appropriately compressed.

A load plate 122 is connected to a pull tube 123 which, in turn, is connected to a spring plate 124. Shoulder 130 on piston 111 transmits the force exerted by piston 111 to load plate 122. Compression spring 110 acts between the end plate 115 and spring plate 124.

Hydraulic fluid passage 131 is provided in head plate 132. Head plate 132 is connected to the housing 104 by cap screws 133 and fluid passage 131 communicates between chamber 134 defined by piston 111, cylinder 114 and seal 120 and port 164 of the pressure reducing valve assembly 153 (FIG. 2a).

The housing 104 (FIG. 1) also acts as the hydraulic fluid reservoir. An outlet 252 is provided in the housing 104 and the fluid passage from the outlet extends to the pump assembly 102 (FIG. 2b) where it communicates with suction passage 521.

The pump assembly 102 (FIG. 1) includes a suction filter 142 (FIG. 2b), a removable pump handle 143 which may be inserted in either of two holes (see FIG. 2a), a plunger 144 movable within a cylinder 150, and a discharge valve 151 (FIG. 2a). A fluid passage 152 extends from the discharge valve 151 to the pressure reducing valve assembly generally shown at 153.

The pressure reducing valve assembly 153 comprises a nozzle 154, a seat 160 within a poppet 161 which is mounted within the valve body 162. A seal 163 acts between the valve body 162 and the poppet 161. A discharge port 164 is positioned in the valve body 162.

A compression spring 170 (FIG. 2a) acts between the valve body 162 and the poppet 161 which may reciprocate within valve body 162. A fluid passage 171 in poppet 161 extends from the downstream side of nozzle 154 to cavity 172 between the poppet 161 and the valve body 162. A discharge port 180 (FIG. 2b) from the cavity 172 is provided in pressure reducing valve assembly 153 which is connected to the accumulator 181 (FIG. 3).

Figure 2B:
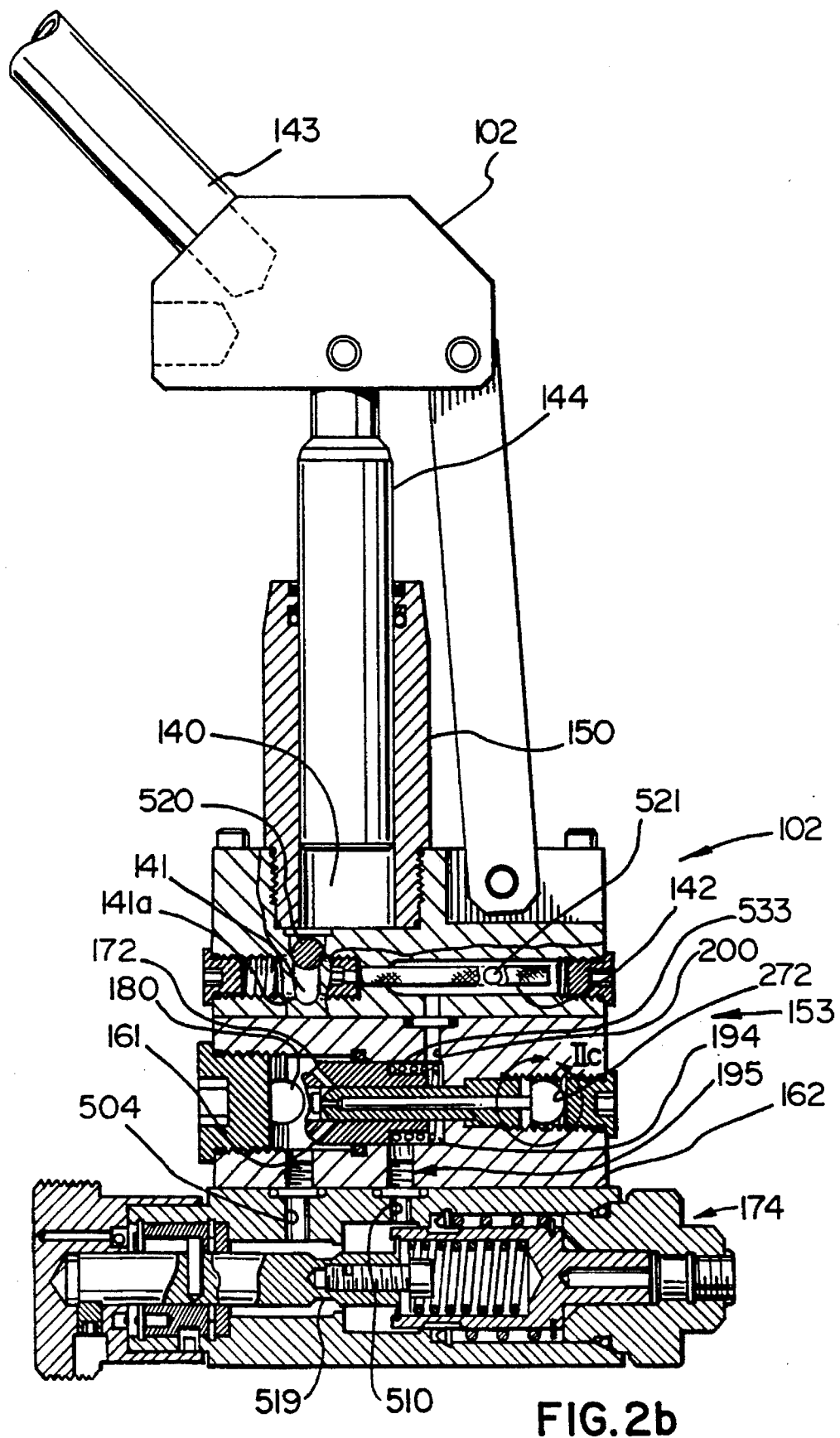
FIG. 2b is a sectional view of the pump, pressure reducing valve and latching trip mechanism illustrated in the TRIPPED position.
Figure 3:
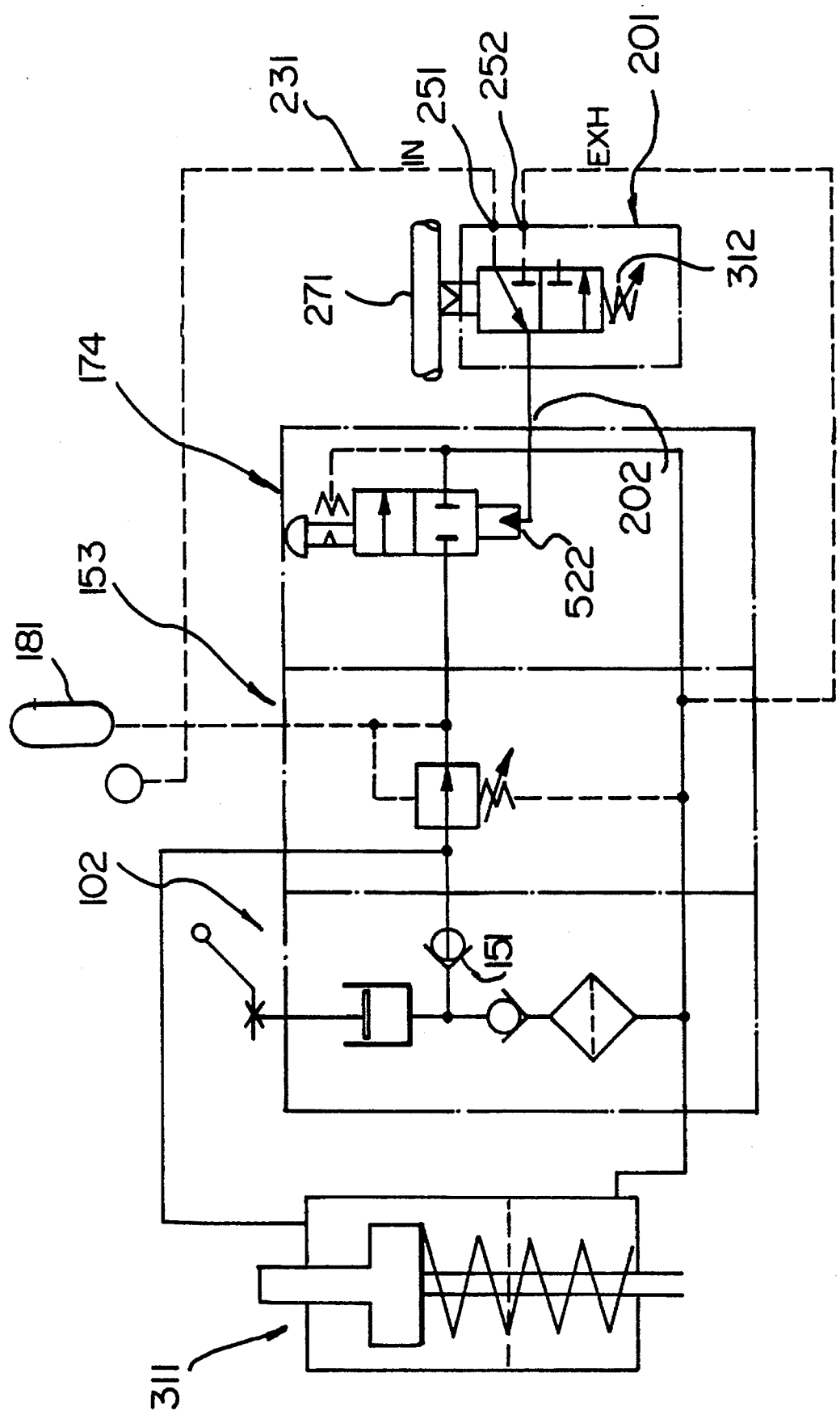
FIG. 3 is a schematic diagram of the hydraulic circuit of the shut-down system.

Referring to FIG. 4a, the latching trip valve used in the embodiments illustrated in FIGS. 2a and 2b is shown in more detail and is generally illustrated at 174. A spool 501 is mounted for longitudinal movement within the body 505 of the latching trip valve 174. Inlet passage 504 communicates with the discharge port cavity 172 (FIG. 2a) of the pressure reducing valve assembly 153 and the chamber 537 (FIG. 4a) between the body 505 and, spool 501. A reservoir or tank passage 510 extends from a second chamber 506 defined by the body 505 and the sleeve 502 and this tank passage 510 communicates with passage 195 (FIG. 2b) in pressure reducing valve assembly 153 which communicates with a second chamber 194 defined between poppet 161 and valve body 162. Chamber 194 communicates with passage 200 and suction passage 521 in pump assembly 102.

Sleeve 502 (FIG. 4a) is connected to spool 501 in the latching trip valve 174 and a removable pin 512 is inserted in the spool 501. A compression spring 507 is positioned within sleeve 502 and a retainer ring 508 and flat washer 509 together with cap screw 515 retain the sleeve 502 on the spool 501. A second compression spring 513 is mounted between a retaining ring 514 mounted on sleeve 502 and a second retaining ring 516 mounted in body 505.

An operating knob 503 is connected to spool 501 by set screw 517. Pin 512 is adapted to bear against an internal cam surface 518 on cam 500. A torsion spring 530 is mounted between the operating knob 503 and cam 500 which is mounted within body 505 and retained by set screw 519. The spring 530 acts to induce torsional force on the operating knob 503 and, therefore, pin 512 in order to retain contact with cam surface 518. Three positions are defined by the cam surface 518, namely the LATCHED, TRIPPED and ARMED positions, respectively, as illustrated diagrammatically in FIG. 4b.

A schematic diagram of the hydraulic circuit and, particularly, the pilot system is illustrated in FIG. 3. It comprises a trip control or three way valve 201 connected to the pipeline 271 using a pressure sensing diaphragm (not shown), the latching trip valve 174, the pressure reducing valve assembly 153, the pump 102 and the valve actuator 311. The trip control valve 201 has two operating positions. In the first operating position, as illustrated, the fluid from the discharge port 180 of pressure reducing valve 153 will pass through the trip control valve 201 and, enter the latching trip valve 174 through signal port 522. In a second position, the inlet port 251 of trip control valve 201 is blocked and the fluid in chamber 523 acting on sleeve 502 is permitted to flow out of chamber 523 through signal port 252 of trip control valve 201 to reservoir 531 as will be described hereafter.

OPERATION

In operation, it will initially be assumed that the gate valve 101 (FIG. 1) is in its closed position as illustrated; that is, the gate valve 101 has previously been closed because of some dislocation in the fluid flow through the pipeline 271 and it is now desired to open the gate valve 101 so that normal flow can resume through the pipeline 271. In such a condition, the cam pin 512 (FIG. 4b) will be in the TRIPPED position 301 on cam 500 illustrated and the spool 501, sleeve 502 and operating knob 503 will be fully to the right as illustrated in FIG. 2b such that fluid may freely flow between ports 504 and 510 because of the access between the ports created by displacement of sleeve 502 and spool 501 such that the groove 519 allows access between cavities 537 and 506 in the absence of signal fluid pressure as will be fully explained hereafter.

To open the gate valve 101, the operating knob 503 will be manually rotated such that pin 512 falls in the LATCHED position 511 (FIG. 4b). Pin 512 will be rotated by knob 503 and is moved leftwardly by cam 500 as viewed in FIG. 4b together with sleeve 502. As it moves leftwardly, compression spring 513 exerts an increasing rightwardly directed force on the retaining ring 514 and, therefore, sleeve 502. Further, as spool 501 is moved leftwardly, the passage between the inlet and reservoir ports 504, 510, respectively, which were in communication by recess 519 when the trip valve 174 was in the TRIPPED position, is now closed. The operating knob 503 of the trip valve 174 will now be in the LATCHED position 511 with reference to FIG. 4b.

The pump handle 143 (FIG. 1) is then activated. A suction is created in the suction passage 521 (FIG. 2b) and fluid enters chamber 140 from the reservoir within the housing 104 (FIG. 1) through the filter 142 and suction check valve 520. When pump handle 143 is pulled downwardly, plunger 144 pushes the fluid out of chamber 140 through discharge check valve 151 (FIG. 2a) and into the pressure reducing valve 153 where it is discharged to chamber 134 (FIG. 1) of the actuator 100 from port 164 in the pressure reducing valve 153. This fluid forces piston 111 downwardly thereby opening the gate valve 101. Simultaneous with the opening of the gate valve 101, the high pressure fluid from the pump assembly 102 is passing through the nozzle 154 of the pressure reducing valve 153 and entering cavity 172 because poppet 161 will be in a leftwardly located position by the influence of compression spring 170 and absent fluid pressure in cavity 172. Poppet 161 remains in its leftwardly located position until pressure begins to build in the pilot circuit. The fluid in chamber 172 cannot travel through latching trip valve 174 because communication between the inlet and reservoir ports 504, 510, respectively, is blocked by spool 501. The fluid will therefore exit from pressure reducing valve assembly 153 through port 180 (FIG. 2b) which communicates with the trip control valve 201 (FIG. 3). The trip control valve 201 is in its tripped position which blocks the flow of fluid to the latching trip valve 174. When the gate valve 101 is fully open and assuming the proper pressure values are obtained in the pipeline 271, the trip control valve 201 will move from its tripped position into its normal operating position as illustrated in FIG. 3 whereby it communicates with signal port 522 of latching trip valve 174. Pressure, therefore, will commence to increase in cavity 523.

As the pressure increases in cavity 523, the sleeve 502 and spool 501 (FIG. 4a) are moved leftwardly such that the pin 512 will move out of its LATCHED position 511 (FIG. 4b) and into its ARMED position 524 under the influence of torsion spring 530. Thus, an equilibrium position has been reached throughout the circuit with the pipeline 271 open and flowing. This is the normal operating condition.

Referring now to FIG. 3, the pilot valve 201 will be in the position illustrated under normal operating conditions; that is, when the pressure in pipeline 271 is within operating tolerances as sensed by the trip control valve 201. In the event the pipeline pressure rises or falls to pressures outside those limits, the trip control valve 201 is shifted, port 251 will be blocked and the signal fluid will exhaust to reservoir 531 through port 252 and the signal pressure at port 522 (FIG. 3 and 4a) will fall to zero. The latching trip valve 174 (FIG. 4a) will thereupon be affected by the sleeve 502 and spool 501 immediately moving rightwardly under absence of signal pressure by compression spring 513. Pin 512 moves on cam 500 as it rotates to the TRIPPED position 301. The recess 519 in spool 501 will allow communication between inlet port 504 and reservoir port 510 and the fluid will flow freely through the latching trip valve 174.

Referring to FIG. 2b, the poppet 161 will move leftwardly under the influence of compression spring 533 with the result that fluid will flow freely between port 272 and port 180 which allows the fluid in cavity 134 to flow outwardly thus closing valve 101 and terminating fluid to the pipeline.

An accumulator 181 (FIG. 3) is provided in the hydraulic circuit and cooperates with the operation of the pressure reducing valve 153 which acts as a pressure relief valve. The ratio between the area of the left end of the poppet 161 exposed to the low pressure of the circuit in cavity 172 and the area of the hole in seat 160 exposed to the high pressure fluid in nozzle 154 is of a value such that when the pressure of the fluid in the actuator cylinder cavity 134 increases due to thermal expansion, the force on the seat 160 of the poppet 161 exceeds the force on the left hand end of the poppet 161. The poppet 161 is thus moved leftwardly allowing a small amount of fluid to flow into the accumulator 181 to relieve the excess pressure in the actuator cylinder cavity 134.

In the event it is desired to manually dump the fluid circuit and thereby to close the gate valve 101, the operating knob 503 is merely pushed inwardly. This has the effect of allowing communication between the inlet and reservoir ports 504, 510, respectively.

Figure 5A:
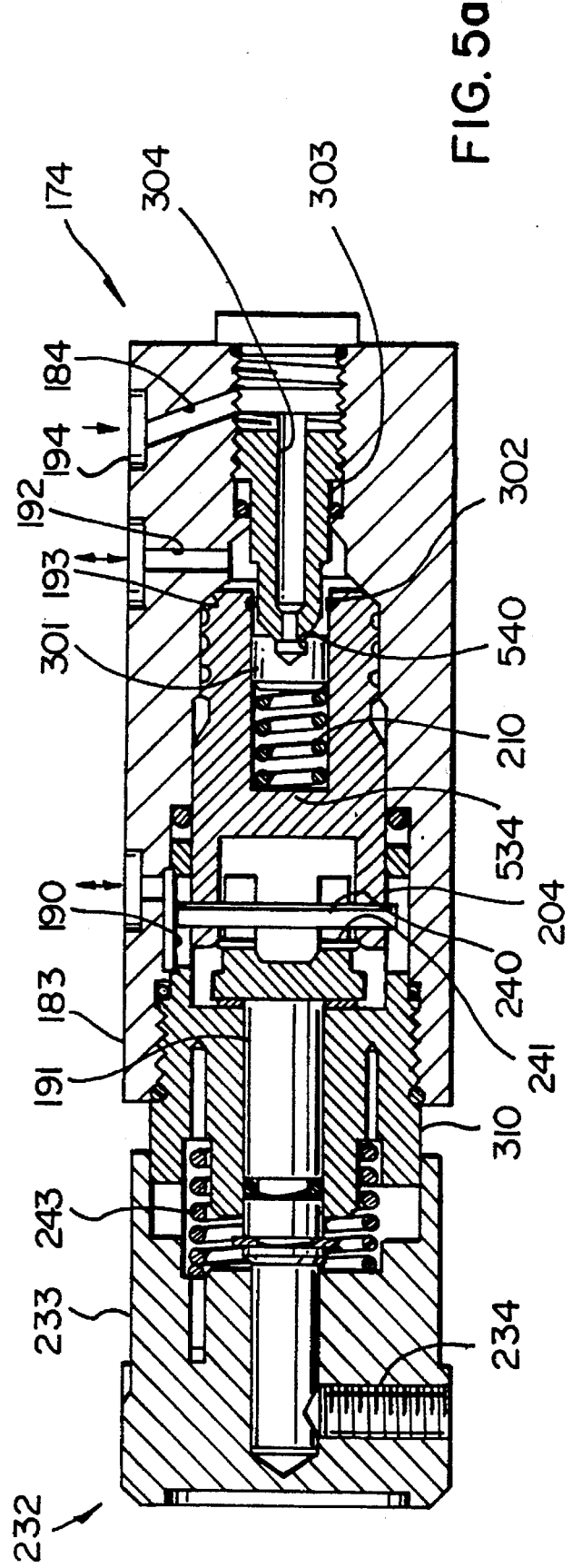
FIG. 5a is an enlarged sectional view of a latching trip valve according to a second embodiment of the invention and shown in the ARMED position.
Figure 2C:
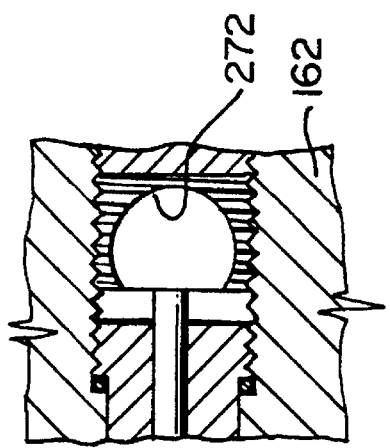
FIG. 2c is an enlarged sectional view of the area shown as IIc in FIG. 2b.
Figure 5B:
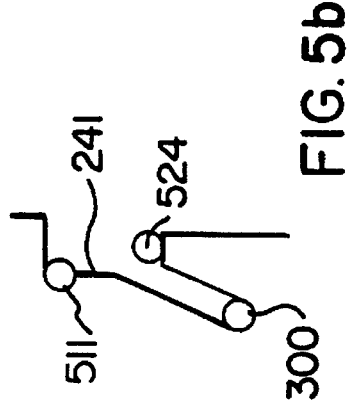
FIG. 5b is a partial view illustrating the cam track and the latching pin of the trip valve of FIG. 5a in its three positions on the cam.

A further embodiment of a latching trip valve 174 is illustrated in FIG. 5a. In this embodiment, the spool 501 in the latching trip valve 174 illustrated in FIG. 4a is replaced by a poppet 204. A cam 241 is operably connected to operating knob 233 by extension shaft 191 and set screw 234. Pin 240 passes through holes in the skirt of poppet 204 and is slidably mounted in axial slots 190 in sleeve 310. Poppet 204 is movable relative to the body 183. A compression spring 210 iS mounted in the cavity 534 of the poppet 204 and acts against a seat 301 which contains a hole 540 against which nozzle 303 acts. Nozzle 303 is threadedly adjustable within body 183 and a keeper ring 302 in poppet 204 prevents seat 301 from exiting poppet 204. The valve is manually closed and latched by rotating operating knob 233, cam extension shaft 191 and cam 241. Rotation of cam 241 forces cam pin 240 from tripped position 300 as shown in FIG. 5b to latched position 511 thus moving poppet 204 rightwardly until hole 540 in seat 301 contacts and seals against nozzle 303. Increasing the signal pressure moves the poppett 204 rightwardly and a torsion spring 243 acting between sleeve 310 and the operating knob 233 acts to rotate the knob to the ARMED position 524 also as illustrated in FIG. 5b. In this embodiment, the circuit can be manually dumped by pushing the knob rightwardly and rotating it in a direction opposite to that of latching. The pin 240 and poppet 204 will thereby be pulled leftwardly into the TRIPPED position 300 as seen in FIG. 5b whereby the seat 301 will be removed from nozzle 540 which creates direct communication between the inlet and reservoir ports 184, 192, respectively. This embodiment also acts as a pressure relief valve through the effect of the actions of nozzle 303, seat 301, spring 210 and the hole in seat 301.

Figure 6:
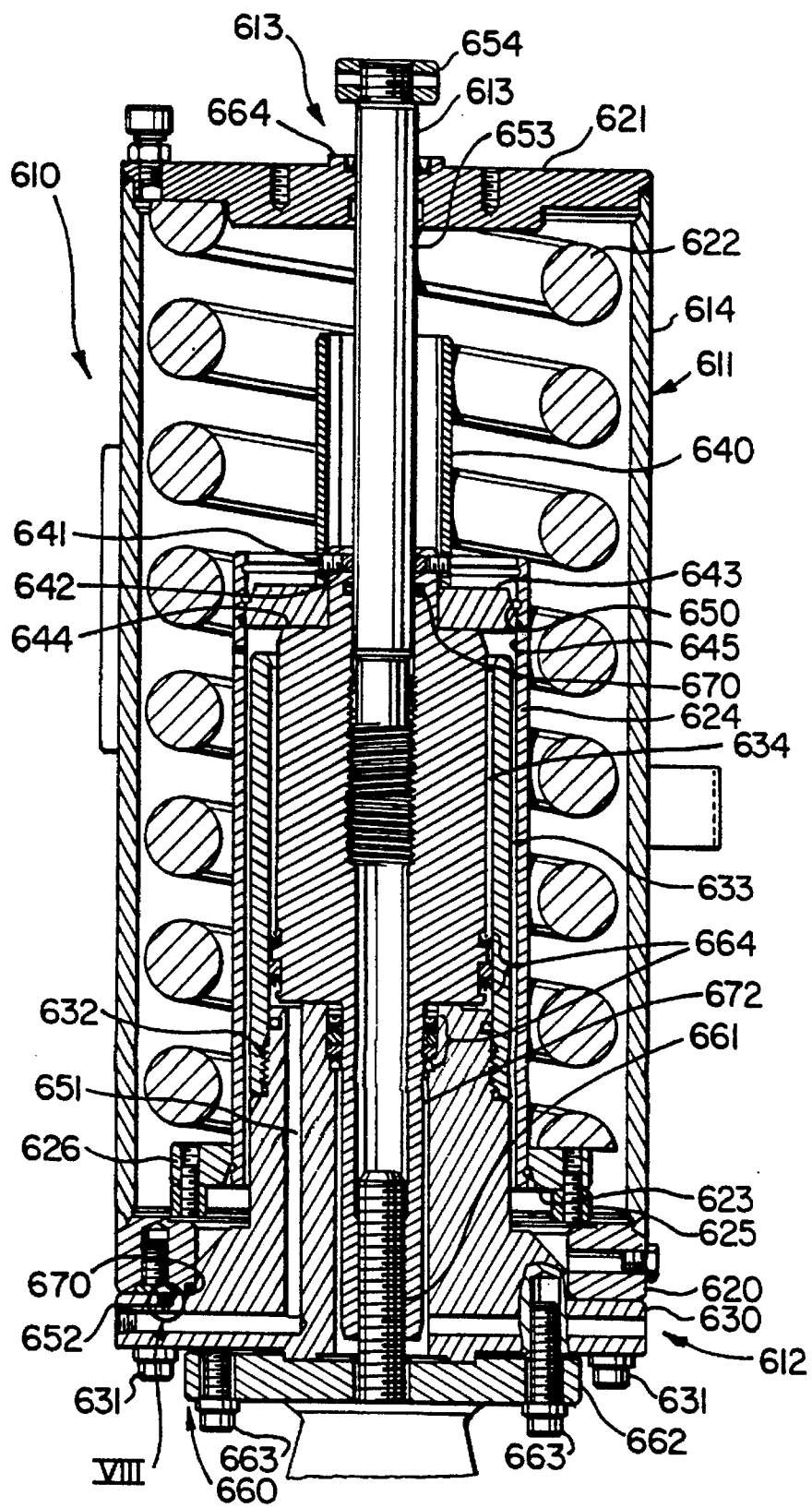
FIG. 6 is a sectional view of a second embodiment of the valve actuator according to the invention.

A second embodiment of the valve actuator known as a direct acting actuator is generally illustrated at 610 in FIG. 6. It comprises a housing generally illustrated at 611, a hub and cylinder assembly generally illustrated at 612 and an indicator rod generally illustrated at 613.

The housing 611 comprises a cylindrical housing 614 and first and second oppositely located end plates 620, 621, respectively, integrally connected to the cylindrical housing 614 as by welding. A compression spring 622 is mounted within the housing 611 and extends between the second end plate 621 and a movable spring plate 623. Spring plate 623 is connected to a pull tube 624 which extends longitudinally and axially from the spring plate 623 towards the second end plate 621.

A preload spacer 625 is positioned between the spring plate 623 and the first end plate 620. It is retained in position by threaded studs 626.

The hub and cylinder assembly 612 includes a hub 630 mounted to first end plate 620 by cap screws 631. Hub 630 has a threaded end 632 opposed from the end connected to the first end plate 620 and this threaded end 632 is connected to a complementary threaded connection on cylinder 633. Cylinder 633 surrounds a piston 634 which, at its lower end, abuts against hub 630 and which, at its upper end, is connected to a stop tube 640 by way of adjustable set screws 641 and nylon plugs 642, the purpose of which will be more fully explained hereafter. A load plate 643 is positioned against shoulder 644 of the piston 634. The load plate 643 is retained within pull tube 624 by a retaining ring 650.

A hydraulic fluid passageway 651 extends through the hub 630 as shown. A flexible valve or elastomer ball 652 is positioned between the fluid passageway 651 and the intersection between the hub 630 and the first end plate 620. As more clearly seen in FIG. 8, the elastomer ball 652 is compressed when the hub 630 is tightly connected to the end plate 620 and the purpose of this configuration being explained in greater detail hereafter.

The indicator rod 613 comprises a shaft 653 and a collar 654 threadedly connected to the shaft 653 and having an outside dimension greater than the outside dimension of the shaft 653. Shaft 653 is threadedly engaged with piston 634 at its end opposite the end connected to the collar 654.

A valve used to shut a pipeline is generally illustrated at 660. The valve 660 comprises, as shown in FIG. 6, a valve stem 661 and a flange 662. The valve stem 661 is threaded and it is received by a complementary threaded connection in piston 634. The valve flange 662 is connected to the hub 630 by cap screws 663.

A number of seals are mounted throughout the actuator 610. Wiper seals 664 are inserted between the hub 630 and the piston 634, between the piston 634 and the cylinder 633 and between the shaft 653 of the indicator rod 613 and the second end plate 621. O-ring seals 670 are mounted between the piston 634 and the shaft 653 and between the first end plate 620 and the hub 630.

In operation, the direct acting valve actuator 610 is illustrated in FIG. 6 in the closed position. That is, the compression spring 622 has moved the spring plate 623 and its attached pull tube 624 downwardly together with the load plate 643, piston 634 and valve stem 661. Thus, the valve to which the actuator 610 is attached will be in the closed position.

When it is desired to open the actuator, hydraulic fluid will be pumped from the reservoir within the housing 611 by way of passageway 651 to a cavity defined by the piston 634, cylinder 633, hub 630 and piston rod 672 by way of hydraulic fluid passage 651. This will force the piston 634 to move upwardly with load plate 643, indicator rod 613, stop tube 640 and valve stem 661. Since the load plate 643 applies a force to pull tube 624 through retaining ring 650, pull tube 624 and spring plate 623 will also move upwardly thus compressing the compression spring 622 until the stop tube 640 comes into contact with the second end plate 621. The valve 660 will then be in the open position and flow through the pipeline can occur.

It may be desired to hold the valve open regardless of the hydraulic pressure between the piston 634 and the hub 630. If this is so, a spacer (not shown) may be inserted between the second end plate 621 and the collar 654. Likewise, since the indicator rod 613 is adjustable within piston 634, the position of the collar 654 may be maintained despite the plurality of stop tubes 640 that may be used between the piston 634 and the second end plate 621.

The stop tube 640 is mounted to the piston 634 by way of adjustable set screws 641 and nylon plugs 642 as described earlier. The nylon plugs 42 are pressed against the indicator rod 13 by set screws 41. The nylon plugs 42 thereby apply a frictional force on the indicator rod 13 preventing it from being unintentionally rotated thus altering the adjustment earlier described. The material from which the plugs 42 are made is selected so as not to score the surface of the indicator rod 13 when it is intentionally rotated.

The outer ends of the set screws 641 protrude into the holes in the stop tube 640 and thereby loosely retain it in position.

It will be seen from FIG. 6 that the spring plate 623 is movable relative to the first end plate 620. This facilitates the removal of one preload spacer set 625 and the insertion of another set having a different and appropriate thickness. The use of different spacers 625 allow the initial preload on compression spring 622 to be varied. Thus, the force acting on the valve stem 661 through the piston 634 when the valve 660 is in its lower or closed position can be varied so as to ensure that the valve 660 is maintained in its closed position.

It will further be seen that the position of the retaining ring 650 between the load plate 643 and the pull tube 624 may also be adjusted. Additional positions 645 defined by grooves for the retaining ring 650 may also be used. These allow the distance between the load plate 643 and the spring plate 623 to be varied such that if the length of the preload spacers 625 is altered, the total useful length of the piston stroke will be utilized. Each groove is positioned in pull tube 624 such that piston 634 will be pulled by compression spring 622 to the bottom of cylinder 633 and into contact with the upper end of hub 630 whenever the hydraulic fluid supporting the underside of the piston is allowed to flow out while compression spring 622 returns to the preload length determined by preload spacers 625.

Figure 8:
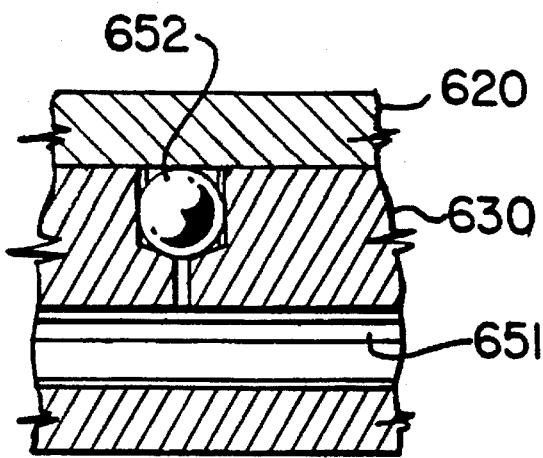
FIG. 8 is an enlarged view of the flexible valve or elastomer ball according to the invention taken at area 8 of FIG. 6.

Referring now to FIG. 8, an elastomer ball 652 is pressed into a hole drilled into the upper face of the flange on hub 630, the hole having an inside diameter smaller than the outer diameter of the ball 652. A smaller hole connects the first hole to hydraulic passage 651. Ball 652 seals against the side walls of the hole and is retained in the hole by first end plate 620. The ball 652 acts to prevent the escape of oil pressure in passageway 651. This is a safety related pressure relief technique used for inadvertent disassembly of the actuator 610 while there is hydraulic pressure present between the piston 634 and the hub 630. When such a disassembly might occur by removing the cap screws 631, there is the potential for the housing 611 and hub 630 to separate in a fairly explosive manner. While the pressure, of course, should be bled off before disassembly, to prevent the inadvertent failure to do so, the ball 652 and passageway are provided so that as the cap screws 631 are removed and the hub 630 separates from the first end plate 620, any pressure present will simply bleed off from passageway 651 into the space between hub 630 and first end plate 620 permitting piston 634 to move towards hub 630 until the preload spacers 625 contact first end plate 620 which then supports the spring preload removing the spring imposed separating forces so the disassembly can proceed safely.

Figure 7:
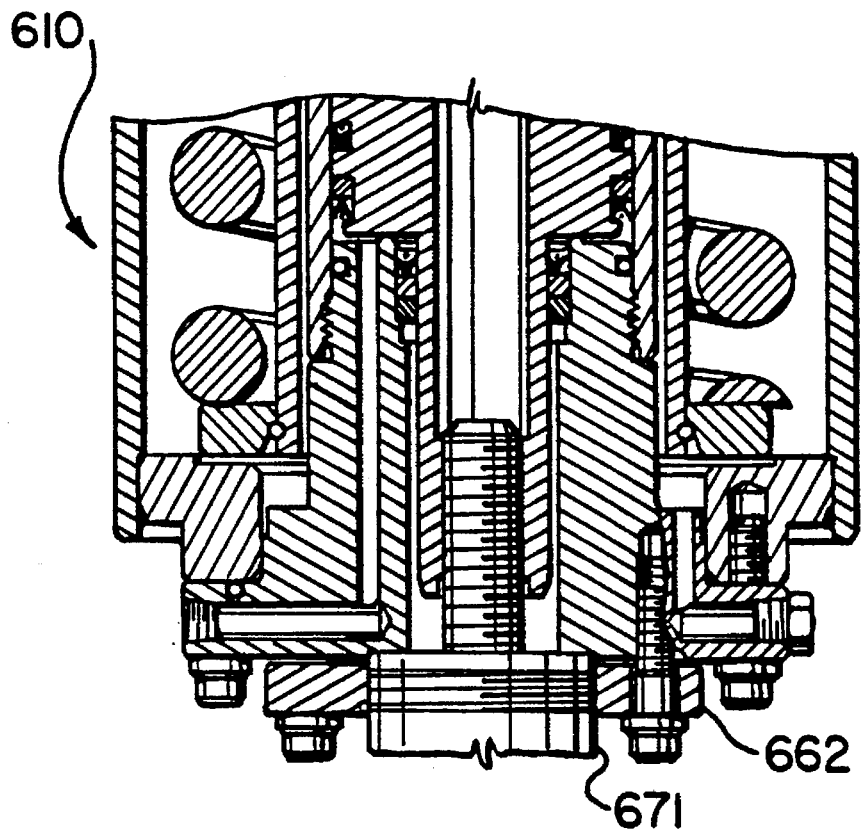
FIG. 7 is a sectional view of the valve actuator similar to FIG. 6 but illustrating the actuator connected to the valve by way of a threaded connection rather than to a valve flange.

The second actuator 610 illustrated in FIG. 7 is identical in most respects with the actuator 610 of FIG. 6. Rather than having a flange 662 integral with the valve, however, as illustrated in FIG. 6, the flange 662 of FIG. 7 is threaded and, therefore, it is separable from the the valve and is attached to a complimentary threaded connection on the bonnet 671.

Additional embodiments to those described will readily occur to those skilled in the art and the specific embodiments described should be construed as illustrative only and not as limiting the scope of the invention as defined in accordance with the accompanying claims.

I claim:

1. Valve actuator apparatus comprising a piston movable within a housing and against the force of a spring within said housing, an indicator rod connected to said piston, said indicator rod being adjustably mounted for relative axial movement relative to said piston and said spring, said spring and said piston remaining stationary during said relative axial movement of said indicator rod relative to said piston.

2. Valve actuator apparatus according to claim 1 wherein said rod is threadedly engaged with said piston.

3. Valve actuator apparatus according to claim 1 and further comprising a collar on the end of said indicator rod, the outside dimensions of said collar being greater than the outside dimensions of said indicator rod.

4. Valve actuator apparatus according to claim 1 and further comprising friction control means mounted between said indicator rod and said piston.

\* \* \* \* \*